United States Patent
Bawa et al.

(10) Patent No.: US 6,212,169 B1
(45) Date of Patent: Apr. 3, 2001

(54) PARAMETER RECONFIGURATION OF CONNECTED CALLS

(75) Inventors: Satvinder Singh Bawa, Ottawa; Bruce Brown, Rockland; Mike Holloway, Stittsville, all of (CA)

(73) Assignee: Alcatel Canada Inc., Kanata (CA)

( * ) Notice: Subject to any disclaimer, the term of this patent is extended or adjusted under 35 U.S.C. 154(b) by 0 days.

(21) Appl. No.: 09/041,958

(22) Filed: Mar. 13, 1998

(51) Int. Cl.[7] ............... G06F 13/00; H04L 12/56
(52) U.S. Cl. ............... 370/252; 370/254; 370/395; 709/221; 714/3
(58) Field of Search ............... 370/252, 254, 370/235, 468, 477, 351, 395, 396, 397; 709/220, 221, 227, 228, 230; 714/1, 2, 3, 4

(56) References Cited

U.S. PATENT DOCUMENTS

| 5,557,748 | * | 9/1996 | Norris | 395/200.1 |
| 5,774,689 | * | 6/1998 | Curtis et al. | 395/500 |
| 5,796,723 | * | 8/1998 | Bencheck et al. | 370/252 |
| 5,872,928 | * | 2/1999 | Lewis et al. | 395/200.52 |
| 5,905,715 | * | 5/1999 | Azarmi et al. | 370/244 |
| 5,982,748 | * | 11/1999 | Yin et al. | 370/232 |

* cited by examiner

Primary Examiner—Alpus H. Hsu
Assistant Examiner—Duc Hu
(74) Attorney, Agent, or Firm—Marks & Clerk

(57) ABSTRACT

A method of determining whether a requested parameter reconfiguration of a connected call in a switched digital communication network complies with system constraints is described. Bandwidth related parameters, in particular, are subject to reconfiguration after a call is provisioned in order to optimize utilization of network resources. The implementation of a bandwidth reconfiguration involves an assessment of bandwidth utilization by the logical or physical links routing the connected call so that the reconfigured bandwidth does not negatively impact on the connected call. Once the reconfigured parameter is determined to be acceptable the reconfiguration data is propagated to the relevant network elements.

18 Claims, 3 Drawing Sheets

PARAMETER RECONFIGURATION OF CONNECTED CALLS

FIELD OF THE INVENTION

This invention relates to data traffic management in switched digital communication networks and more particularly to methods of reconfiguring traffic parameters of connected calls or logical links and determining whether the reconfigured parameters comply with network constraints, propagating the reconfiguration parameters through network elements and recovering from failures encountered in reconfiguration attempts.

BACKGROUND

Switched digital communications networks such as Asynchronous Transfer Mode (ATM) and Frame Relay (FR) find particular application in the delivery of multimedia services. In such networks calls are transported across the network architecture by way of switching nodes within the network core. A network management system establishes and controls traffic flow between switching nodes.

Calls or logical links (trunk groups) connected in such a network have various associated call parameters. In the case of ATM, these parameters include Peak Cell Rate (PCR), Sustained Cell Rate (SCR), Maximum Burst Size (MBS), Cell Delay Variance Tolerance (CDVT), Traffic Descriptor, Traffic Policing methods etc. For Frame Relay, such parameters include Committed Information Rate (CIR), Committed Burst Size (Bc), Excess Burst Size (Be), etc. For Frame Relay calls travelling over ATM networks, many of the ATM call parameters are also required. Parameters associated with a call or a trunk group define the expected characteristics of data allowed to flow through them.

As such, these parameters are usually best guesses for the kind of data traffic expected through a call, or a trunk group. Once a call or a trunk group has been provisioned in a network, it might be discovered that some changes are required to some of the parameters in order to make better use of network resources. At this time, there might be customer data flowing through the calls, and hence any disruptions in that flow may be undesirable, or even unacceptable.

Reconfiguration of an already connected call requires a mechanism for the determination of the correctness of the new parameters, propagation of the new parameters to all the relevant network elements, and if there is a failure in propagation of such parameters, recovery from such failures.

SUMMARY OF THE INVENTION

The present invention finds application in the management of switched digital communications networks.

Accordingly, it is an object of the present invention to provide a mechanism for reconfiguring a call or a logical link, and in doing so providing a determination of the correctness of the new parameters, propagating new parameters to relevant network elements, and recovering from any failures encountered during reconfiguration attempt.

Therefore, in accordance with a first aspect of the present invention there is provided in a switched digital network having a network management system for provisioning service parameters of network elements to route communication sessions between network end points, a method of determining whether a requested parameter reconfiguration to a provisioned and connected call complies with service parameters negotiated for said call comprising: determining network requirements for requested reconfiguration parameters; comparing requested reconfiguration parameters with existing parameters for connected call and calculating a parameter differential; determining whether requested reconfiguration parameters fall within network parameter ranges; and determining whether the calculated parameter differential complies with negotiated service characteristics.

In a second aspect of the invention the algorithm provides a method of determining the correctness of a planned reconfiguration taking into account the parameter assignment respecting the logical link carrying a connected call.

In both algorithms there are provisions for transporting accepted reconfiguration parameters to network elements routing a connected call and to recover from a reconfiguration process if any of the network elements reject the new parameters.

BRIEF DESCRIPTION OF THE DRAWINGS

The invention will now be described in greater detail with reference to the attached drawings wherein.

DETAILED DESCRIPTION OF THE INVENTION.

In a network of the type considered in this discussion all the re-configurable parameters of a call or logical link may be divided into two broad categories. These are:

1) Specification of the amount of data that may pass through a call or logical link. This specification is also termed as the bandwidth of a call or a logical link. SCR, PCR, CIR, and in the case of logical links, link capacity are parameters of this type; and 2) Specification of the nature of data that may pass through a call or logical link. CDVT, MBS, Bc, Be, Traffic Descriptor, and Traffic policing are parameters of this type.

Parameters relating to the bandwidth category require checks along their route, through the network, for bandwidth availability and for reconfiguration of bandwidth to a higher value. These parameters also require checks for the permissibility of operations such as reduction of bandwidth.

Figure 1:
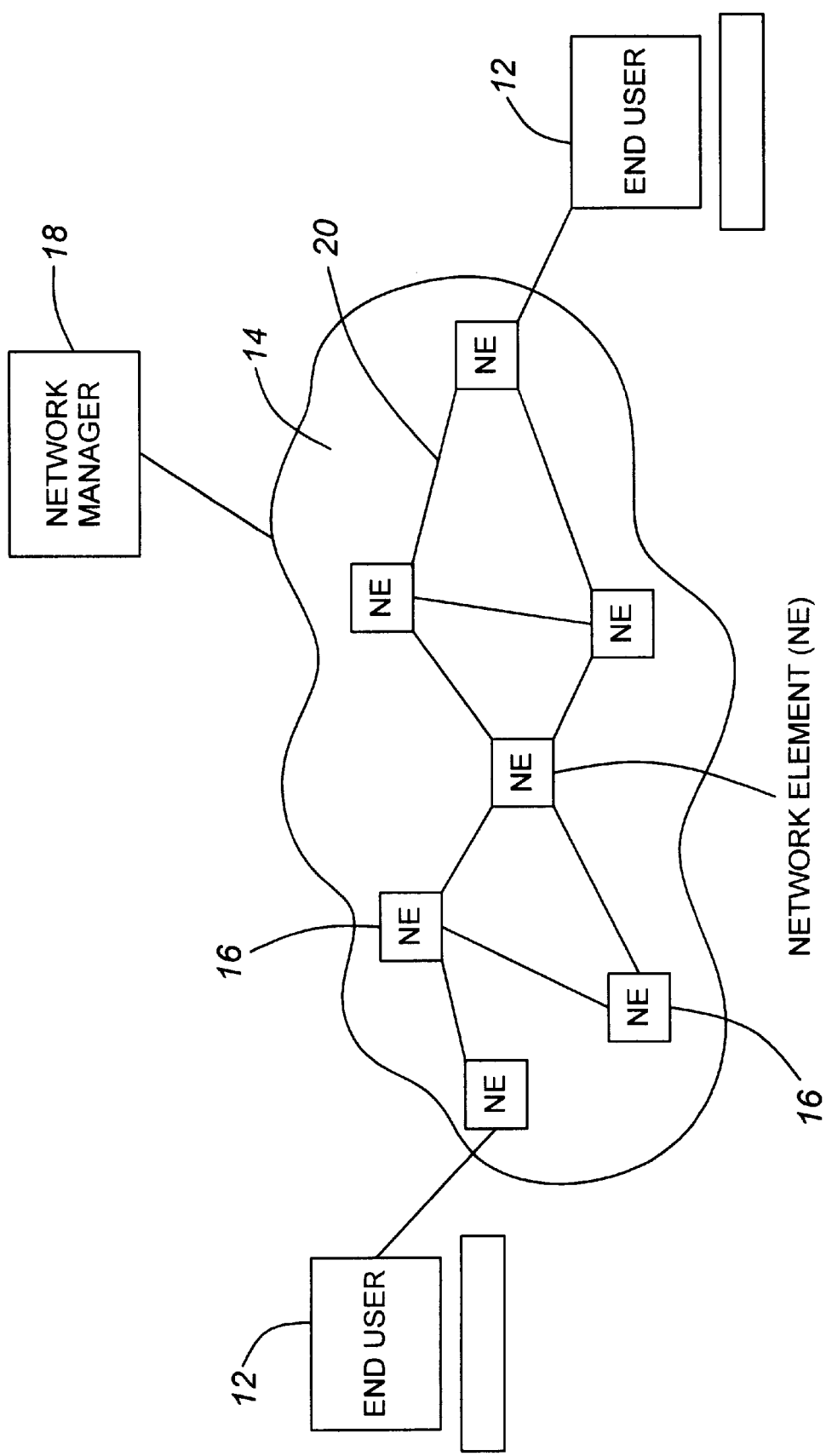
FIG. 1 is a high level illustration of a network architecture.

As shown in FIG. 1 end users 12 are connected to the network 14. The switched network 14 includes network elements 16 that are provisioned by network manager 18 to route calls over selected links 20. As discussed previously initial provisioning as to parameter assignment is completed on a best estimate basis and reconfiguration may sometimes be required to make better utilization of network resources. When a call has already been established through a given route, however, it is important that any contemplated reconfiguration of parameters be checked for correctness prior to implementation.

According to the present invention the algorithm to check the correctness of a planned reconfiguration is implemented as follows:

For calls;
  Calculate the difference of the new or requested bandwidth, and the existing bandwidth as the bandwidth delta.
  For every single physical, or logical link traversed by the call, check to determine whether:

the New Bandwidth of the call is greater than, or equal to minimum permitted bandwidth of a call or logical link on the link;

the New Bandwidth of the call is less than, or equal to maximum permitted bandwidth of a call or logical link on the link; or the available bandwidth in the link is greater than the bandwidth delta for the call.

If any of the above checks fail, then reject reconfiguration request.

For logical links;

Calculate the bandwidth utilization of calls riding this logical link

If the new bandwidth of logical link is less than bandwidth utilization, then reject reconfiguration request Calculate the difference of requested, and existing bandwidth as the bandwidth delta.

For every single physical link traversed by this logical link, check to determine whether:

the New Bandwidth of logical link is greater than, or equal to minimum permitted bandwidth of a call or logical link on the physical link;

the New Bandwidth of logical link is less than, or equal to maximum permitted bandwidth of a call or logical link on the physical link; or the available bandwidth in the link is greater than the bandwidth delta for the logical link.

If any of the above checks fail, then reject reconfiguration request.

For calls or logical links;

If reconfiguration not rejected due to any reason, then send reconfiguration requests to network elements used by the call or logical link If any reconfiguration request is rejected by any network element, reset the configuration to the original values, and re-send the reconfiguration requests to all network elements. If any of the re-sent original reconfiguration requests is rejected by any network element, then disconnect the call, or logical link in question.

Figure 2:
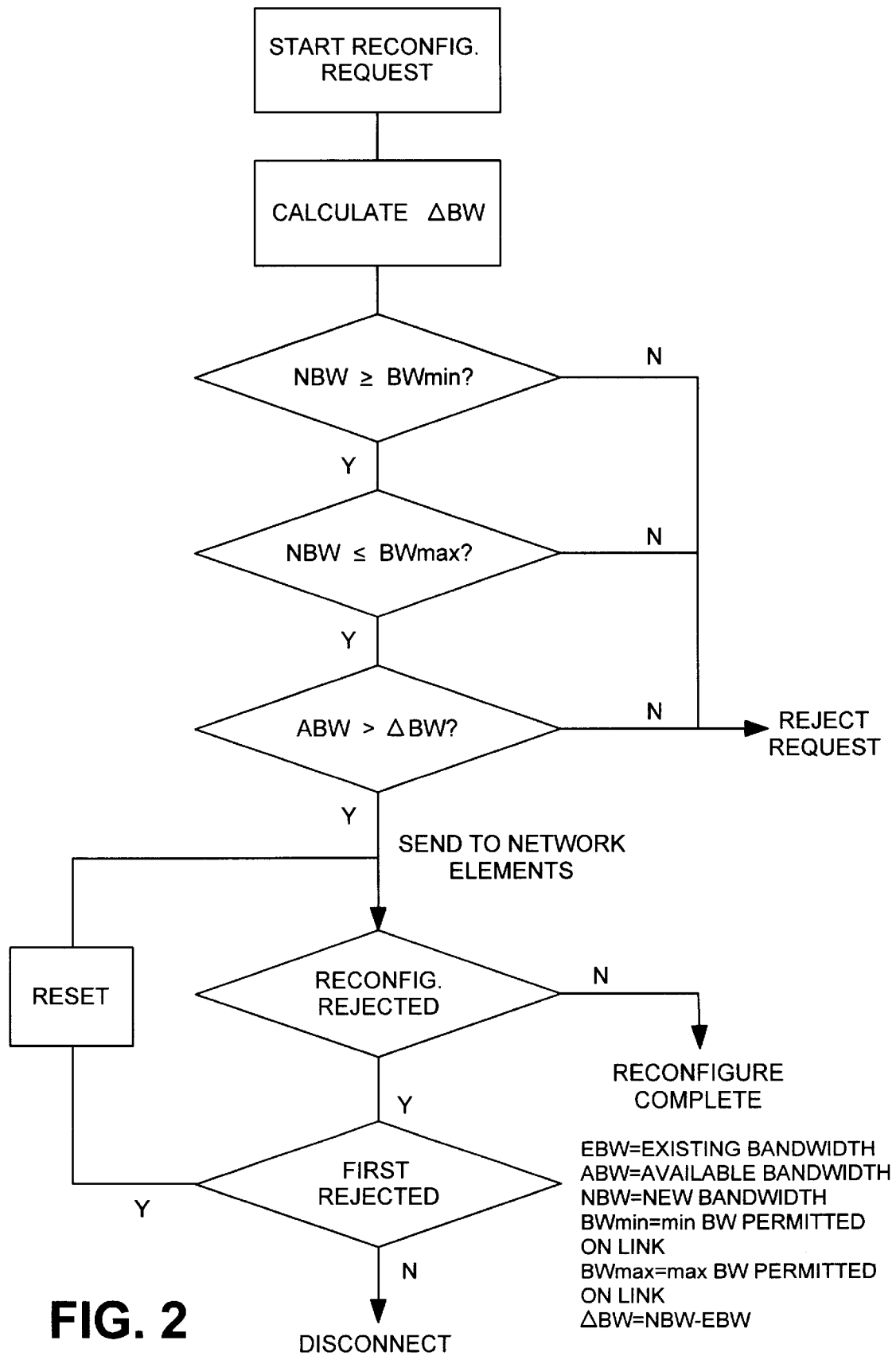
FIG. 2 is a flow diagram of the process for reconfiguring a connected call.
Figure 3:
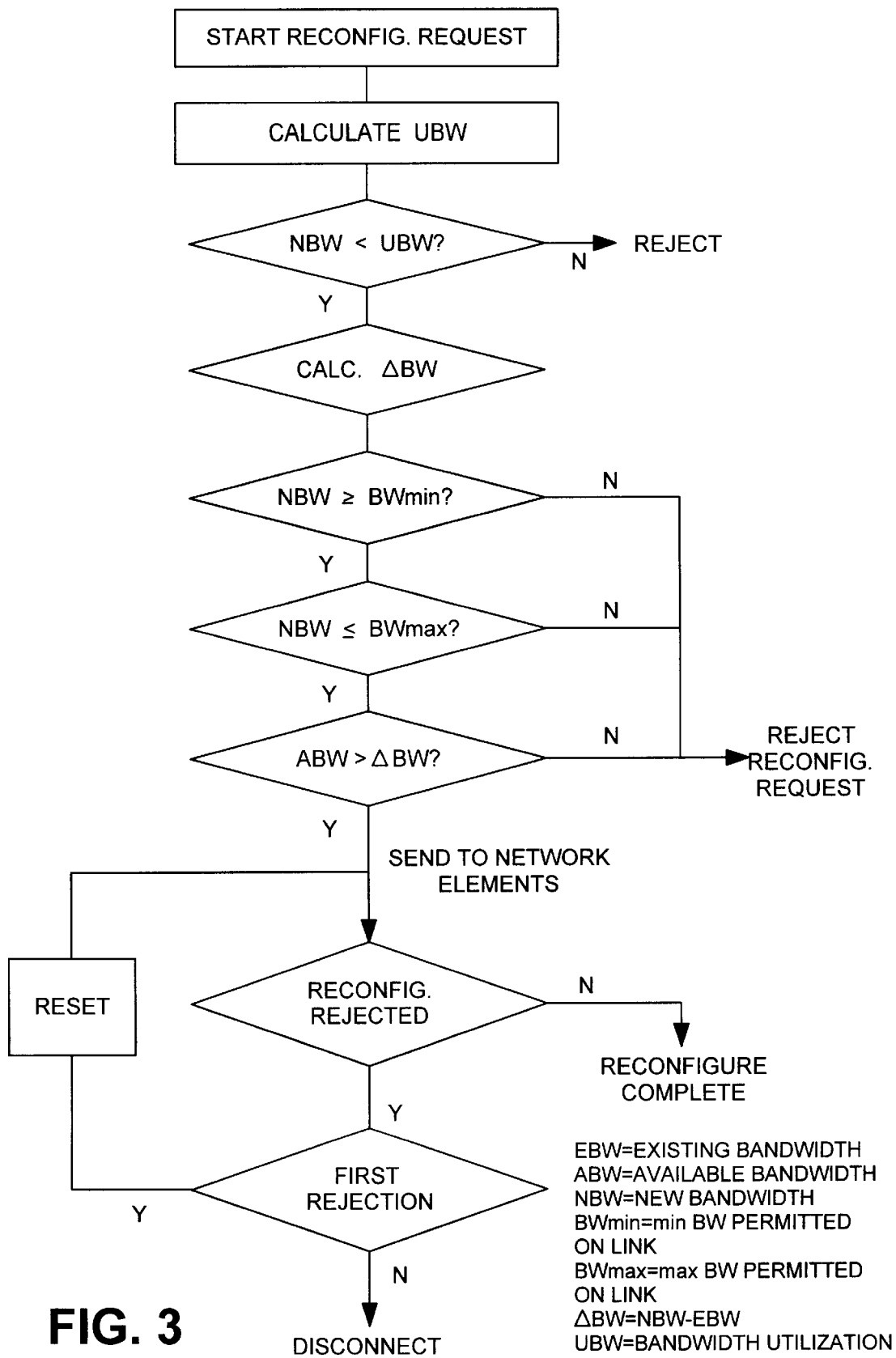
FIG. 3 is a flow diagram of the process for reconfiguring a logical link or trunk group.

FIG. 2 is a flow diagram of the algorithm for checking the correctness of a reconfiguration of a connected call. FIG. 3 outlines procedures for verifying the correctness of a planned reconfiguration to a logical link or trunk group.

The above algorithms may be further elaborated as follows.

The concept of checking for availability of bandwidth is a simple one. Simply check that additional bandwidth requests for a call can be met by available bandwidth on all physical and logical link segments traversed by the call or logical link under reconfiguration. As minimization of data flow disruption is a primary objective of the reconfiguration process, alternate routes are not considered during reconfiguration. It is contended that if data flow disruption is not an issue, then a user may always elect to disconnect, reconfigure, re-connect a call, or a logical link.

As indicated above the algorithm for checking the correctness of a planned reconfiguration for a permanent virtual circuit (PVC), wherein provisioning is effected by the network manager, is relatively straightforward. With the advent of switched virtual circuits (SVCs), which are calls established by the network elements, the central provisioning system being used for routing/reconfiguring calls or logical links may not have the most recent data on bandwidth availability. It is very likely that the provisioning system may query a network element for bandwidth availability, discover that bandwidth is available, and request a bandwidth reconfiguration, but before such a request has been fulfilled, the network elements route a SVC, and use up the available bandwidth. This will result in a rejection of the bandwidth reconfiguration request.

Reconfiguration request rejections can also occur for bandwidth size reduction. A typical scenario where this might happen is a logical link such as a VPCL (Virtual Path Circuit Link), used to carry SVC traffic. In such a case it is possible to reduce the bandwidth to a size no less than the bandwidth required by all the calls, both SVCs, and PVCs. In this case again, the bandwidth utilization of a VPCL may be determined by sending requests to appropriate network elements. Based on the response for bandwidth utilization, it might be determined that the requested lowering of bandwidth is permissible. However, before the actual lowering of bandwidth occurs, the Network Elements may route new SVCs through the VPCL in question. This will result in a rejection of bandwidth reconfiguration request.

Whenever a reconfiguration request rejection is received by the provisioning system, the reconfiguration process is aborted, and an attempt is made to undo the reconfiguration from any other network elements, which had done the reconfiguration successfully. It is possible, although highly unlikely, that some of the requests to network element meant to undo reconfiguration may also get rejected by a network element. In such an event, the call or logical link under reconfiguration is disconnected.

The provisioning mechanism may itself reject bandwidth reconfiguration requests if it is discovered that the call or logical link in question may violate the bandwidth size restrictions for the different physical, and/or logical links used in the routing of a call. These restrictions typically restrict the minimum and maximum bandwidth of any call, or logical link traversing a particular physical or logical link. Thus, if post reconfiguration bandwidth will be less than the maxima of the set of minimum bandwidths of logical or physical links used, or more than the minima of the set of maximum bandwidths of logical or physical links used, then the reconfiguration request will be rejected by the provisioning system.

Parameters relating to the nature of data in calls, or logical links are simply conveyed to the network elements through parameter value reconfiguration requests. If any of these requests gets rejected, the original parameter values are resent to the network elements.

While particular embodiments of the invention have been described and illustrated it will be apparent to one skilled in the art that numerous changes can be implemented. It is to be understood that all such changes will fall within the scope of the invention as defined by the appended claims.

What is claimed is:

1. A method of determining whether a requested reconfiguration of call parameters to a provisioned and connected call in a switched digital communications network complies with service parameters negotiated for said provisioned and connected call comprising:
   a) calculating a differential between existing call parameters for the provisioned and connected call and call parameters for the requested reconfigured call;
   b) determining whether parameters for said requested reconfigured call fall within network parameter ranges;
   c) determining whether the calculated differential between existing call parameters for the provisioned and connected call and call parameters for the requested reconfigured call is less than parameters provisioned for the communications; and determining that said requested reconfiguration complies with service parameters of said network if conditions b) and c) are satisfied.

2. A method as defined in claim 1 wherein said parameters to be reconfigured relate to bandwidth.

3. A method as defined in claim 2 wherein said requested reconfiguration is rejected if the requested reconfiguration bandwidth does not fall within bandwidth ranges assigned to the network.

4. A method as defined in claim 3 wherein said bandwidth ranges apply to both minimum bandwidth and maximum bandwidth provisioned for the route established for the connected call.

5. A method as defined in claim 2 wherein said requested reconfiguration is rejected if the differential bandwidth representing the difference between new bandwidth and existing bandwidth, is greater than the available bandwidth in the route established for the connected call.

6. A method as defined in claim 2 wherein said reconfiguration bandwidth parameters are transported to said network elements if said reconfiguration request is approved.

7. A method as defined in claim 6 wherein said connected call is disconnected if any network elements in the connected call route rejects the reconfiguration parameters.

8. A method as defined in claim 7 wherein said bandwidth reconfiguration parameters are transported to network elements in the route of the connected call upon acceptance thereof.

9. A method as defined in claim 8 wherein said connected call is disconnected if any of said network elements refuse the reconfiguration parameters.

10. A method as defined in claim 1 further including the step of determining whether the reconfiguration parameters are within supported ranges for the logical link routing the connected call.

11. A method as defined in claim 10 wherein the reconfiguration parameters relate to bandwidth.

12. A method as defined in claim 11 wherein a finding that any of said parameter reconfiguration requests do not satisfy service parameters results in a rejection of said parameter reconfiguration request.

13. A method of reconfiguring an existing connected call in a switched digital communications network to improve utilization of network bandwidth comprising:
    a) calculating a bandwidth differential by subtracting bandwidth utilization of the existing connected call from bandwidth to be used by the reconfigured call;
    b) determining whether bandwidth to be used by the reconfigured call is greater than or equal to a minimum bandwidth permitted on a link used by the reconfigured call;
    c) determining whether bandwidth to be used by the reconfigured call is les than or equal to a maximum bandwidth permitted on said link;
    d) determining whether available bandwidth on said link is greater than said bandwidth differential and
    e) rejecting a request to reconfigure said existing call if the conditions in steps b), c) or d) are not satisfied otherwise forwarding said request to network elements in said communications network.

14. The method according to claim 13 wherein if any one of said network elements rejects said request to reconfigure the bandwidth then bandwidth is reset to the bandwidth of the existing connected call and the reset value is forwarded to said network elements.

15. The method according to claim 14 wherein if said reset value is rejected by any of said network elements the connected call is disconnected.

16. A method of reconfiguring an existing logical link in a switched digital communications network to improve utilization of network bandwidth comprising:
    a) calculating total bandwidth utilization for all calls on said logical link;
    b) determining whether bandwidth utilization of a reconfigured logical link is less than said total bandwidth utilization and if so reject reconfiguration of said logical link, otherwise
    c) calculating a bandwidth differential by subtracting bandwidth utilization of the existing logical link from bandwidth to be used by the reconfigured logical link;
    d) determining whether bandwidth to be used by the reconfigured logical link is greater than or equal to a minimum bandwidth permitted on a physical link used by the reconfigured logical link;
    e) determining whether bandwidth to be used by the reconfigured logical link is less than or equal to a maximum bandwidth permitted on said physical link;
    f) determining whether available bandwidth on said physical link is greater than said bandwidth differential and
    g) rejecting a request to reconfigure said existing logical link if the conditions in steps b), c) or d) are not satisfied otherwise forwarding said request to network elements in said communications network.

17. The method of claim 16 wherein if any one of said network elements rejects said request to reconfigure the bandwidth then bandwidth is reset to the bandwidth of the existing connected logical link and the reset value is forwarded to said network elements.

18. The method according to claim 17 wherein if said reset value is rejected by any of said network elements the a call on the connected logical link is disconnected.

* * * * *